United States Patent [19]

Grant et al.

[11] Patent Number: 4,991,038
[45] Date of Patent: Feb. 5, 1991

[54] AUTOMATIC THREADING OF A WEB USING A FLEXIBLE THREADING BAND

[75] Inventors: Frederic F. Grant, Bellflower; Vincent J. Piarulli, Simi Valley, both of Calif.

[73] Assignee: Datatape Incorporated, Pasadena, Calif.

[21] Appl. No.: 274,900

[22] Filed: Nov. 21, 1988

[51] Int. Cl.⁵ .................................................. G11B 15/61
[52] U.S. Cl. ........................................ 360/85; 360/95
[58] Field of Search ................... 360/85, 95, 71, 93, 360/130.2–130.24; 242/197, 199

[56] References Cited

U.S. PATENT DOCUMENTS

| | | | |
|---|---|---|---|
| 3,235,195 | 2/1966 | Hebb et al. | 360/93 |
| 3,688,055 | 8/1972 | Inaga et al. | 360/95 |
| 3,871,025 | 3/1975 | Nakamoto | 360/85 |
| 4,017,897 | 9/1975 | Blanding | 360/85 |
| 4,054,925 | 10/1977 | Towner et al. | 360/71 |
| 4,166,283 | 8/1979 | van Slageren | 360/95 |
| 4,170,787 | 10/1979 | Gunschmann et al. | 360/95 |
| 4,191,979 | 3/1980 | Poehler | 360/85 |
| 4,264,937 | 4/1981 | Kabacinski | 360/85 |
| 4,322,761 | 3/1982 | Beitler et al. | 360/85 |
| 4,620,245 | 10/1986 | Shimizu | 360/85 |
| 4,672,476 | 6/1987 | Saito et al. | 360/85 |
| 4,772,969 | 9/1988 | Grant | 360/85 |

*Primary Examiner*—David J. Severin
*Attorney, Agent, or Firm*—William F. Noval

[57] ABSTRACT

A web, contained in a cassette, is automatically threaded along an external transport path past a web utilization station, by means of a flexible threading band which pushes the web around the path. In a preferred embodiment, magnetic tape, contained in a cassette, is automatically threaded about a tape transport path past a magnetic head assembly by means of a flexible threading band contained in a threading band. The threading band is positioned behind a segment of the magnetic tape and is ejected from its own cassette, (1) to pull the magnetic tape out of the tape cassette, (2) to wrap the tape around a rotary head scanner of a magnetic tape recording/reproducing apparatus, and (3) to configure the tape to the tape transport path. After the tape is threaded, the flexible band is withdrawn into its cassette.

9 Claims, 6 Drawing Sheets

AUTOMATIC THREADING OF A WEB USING A FLEXIBLE THREADING BAND

BACKGROUND OF THE INVENTION

This invention relates to web transport apparatus and, more particularly, to the automatic threading by means of a flexible threading band of a web, contained in a cassette, along an external web transport path past a web utilization station.

Web-utilization devices, such as magnetic tape recorders, frequently operate with long strips of web wound on supply and take-up reels in a cassette. The utilization device must extract the web from the cassette in order to move it along a transport path within the device past one or more web utilization stations. Thus, for example, a helical scan magnetic tape recorder typically records and reproduces information on magnetic tape which is wound on supply and take-up reels contained in a cassette which is removable from the recorder. The tape transport path within the recorder is complex and may include, for example, several tape guides, tape-tension mechanisms, drive capstans, fixed magnetic heads and a rotary head scanner about which the tape is wrapped at a helix angle relative to the plane of rotation of the rotary heads.

Various techniques have been proposed for automatically threading magnetic tape from cassettes along the tape path of the recorder. The vast majority of these techniques utilize mechanical guides and posts which are manipulated by means of complex slides and linkages to extract the tape from a cassette and to configure it to the tape recorder transport path. Examples of such mechanical threading techniques are disclosed in the following patents: U.S. Pat. No. 3,688,055, issued Aug. 29, 1972, entitled GUIDE PLATE FOR USE WITH TAPE RECORD/PLAYBACK MECHANISM; U.S. Pat. No. 4,017,897, issued Apr. 12, 1977, entitled MAGNETIC TAPE GUIDE HAVING A TAPPERED ROLLER AND AN ADJUSTABLE CONTOURED EDGE; U.S. Pat. No. 4,170,787, issued Oct. 9, 1979, entitled TAPE RECORDING/REPRODUCING APPARATUS, PARTICULARLY FOR OPERATION WITH VIDEO TAPE CASSETTES; U.S. Pat. No. 4,191,979, issued Mar. 4, 1980, entitled DEVICE FOR EXTRACTING AND POSITIONING ! VIDEO TAPE FROM A CASSETTE TO AROUND A SLIT HEAD DRUM; U.S. Pat. No. 4,322,761, issued Mar. 30, 1982, entitled TAPE GUIDE IN A HELICAL SCAN CASSETTE RECORDER; U.S. Pat. No. 4,264,937, issued Apr. 28, 1981, entitled MAGNETIC TAPE GUIDE ALIGNMENT DEVICE; U.S. Pat. No. 4,166,283, issued Aug. 28, 1979, entitled SELF-THREADING HELICAL SCAN VIDEO CASSETTE RECORDER; U.S. Pat. No. 3,871,025, issued Mar. 11, 1975, entitled TAPE LOADING SYSTEM FOR AUTOMATICALLY WITHDRAWING A TAPE FROM A CASSETTE AND ENGAGING THE TAPE WITH A RECORDING AND/OR REPRODUCING HEAD; U.S. Pat. No. 4,620,245, issued Oct. 28, 1986, entitled TAPE LOADING APPARATUS FOR USE IN A RECORDING AND/OR REPRODUCING APPARATUS OF THE ROTATING HEAD KIND; and U.S. Pat. No. 4,672,476, issued June 9, 1987, entitled MAGNETIC TAPE RECORDING AND/OR REPRODUCING APPARATUS.

The mechanical tape-threading devices disclosed in these patents have the following disadvantages: (1) the devices are complex, expensive and space-consuming; (2) the many moving parts of the device are subject to mechanical breakdown, requiring repair; (3) the mechanical device is noisy during threading and unthreading and not suitable for applications requiring quiet operation; (4) the device subjects the tape to wear, damage and stretching; (5) the movable guides which establish the helix angle of wrap of tape around the rotary head scanner may be misaligned, thus causing mistracking of a reproduce head on recorded tracks and consequent poor signal reproduction; (6) the path of the tape in a helical scan recorder utilizes both movable guides and fixed capstans which require severe manufacturing tolerances, thus resulting in high manufacturing cost to achieve high reproduce/record signal quality and interchangeability of tape cassettes.

In order to minimize the disadvantages of mechanical tape-threading devices, a less complex threading technique has been proposed in commonly assigned U.S. Pat. No. 4,772,969, issued Sept. 20, 1988, entitled "EXPANDABLE LOOP" METHOD OF AND APPARATUS FOR AUTOMATICALLY THREADING A WEB MATERIAL TO THREAD TAPE FROM A CASSETTE INTO THE TRANSPORT PATH OF A MAGNETIC TAPE RECORDER BY MEANS OF AN AIR EVACUATION TECHNIQUE. As disclosed in this patent, a vacuum source establishes an air pressure gradient to controllably pull tape, spanning the supply and take-up reels of a cassette, toward the transport elements of a magnetic tape recorder. The tape forms an expandable loop which ultimately takes the shape of the tape transport path. The pneumatic-threading technique of the latter patent provides a simplified and less expensive design than known mechanical threading systems. Moreover, tape threading is significantly faster and more gentle, with less likehood of damage or tearing to the tape. Although the latter technique is suitable for the purposes for which it was intended and solves many of the problems of mechanical-threading techniques, there may be applications where space will not permit use of a pneumatic system because of the amount of space consumed by an air evacuation system.

SUMMARY OF THE INVENTION

According to the present invention, there is provided a technique for automatically threading a web which obviates the disadvantages of mechanical web-threading techniques and which does not require the use of an air evacuation system. According to an aspect Of the present invention, a web, such as magnetic tape, contained in a cassette, is automatically threaded along a web transport path past a web-utilization station by means of a flexible threading band which is expanded behind the web (tape) to push the web (tape) into a loop which conforms to the web (tape) transport path. The threading band is then removed and web (tape) transport elements are moved into position to move and guide the web along the transport path.

According to another feature of the present invention, magnetic tape contained in a cassette is automatically threaded along a tape transport path past a magnetic head assembly of a magnetic tape recorder by means of a flexible threading band contained in a threading band cassette which is moved into position behind a segment of the tape. The flexible threading band is wound on a pair of reels which are unwound to eject the band from the band cassette, in order to push the magnetic tape around the magnetic head assembly and then into the configuration of the tape transport path. The threading band is then wound back up into its cassette. Tape guide and transport elements are moved into engagement with the tape to effect transport around the transport path.

BRIEF DESCRIPTION OF THE DRAWINGS

The invention will be described with reference to the accompanying drawings in which like elements are numbered with like numbers.

DETAILED DESCRIPTION OF THE PREFERRED EMBODIMENT

Although an embodiment of the present invention will be described below as incorporated in a magnetic tape recorder, it will be understood that the present invention may be used in any web-utilization device for automatically threading a web along a web transport path past a web-utilization station. Moreover, although, the embodiment of the present invention described below is used for threading magnetic tape from a coplanar reel type cassette, it will be understood that the present invention may also be used with coaxial reel-type tape containers.

Figure 1:
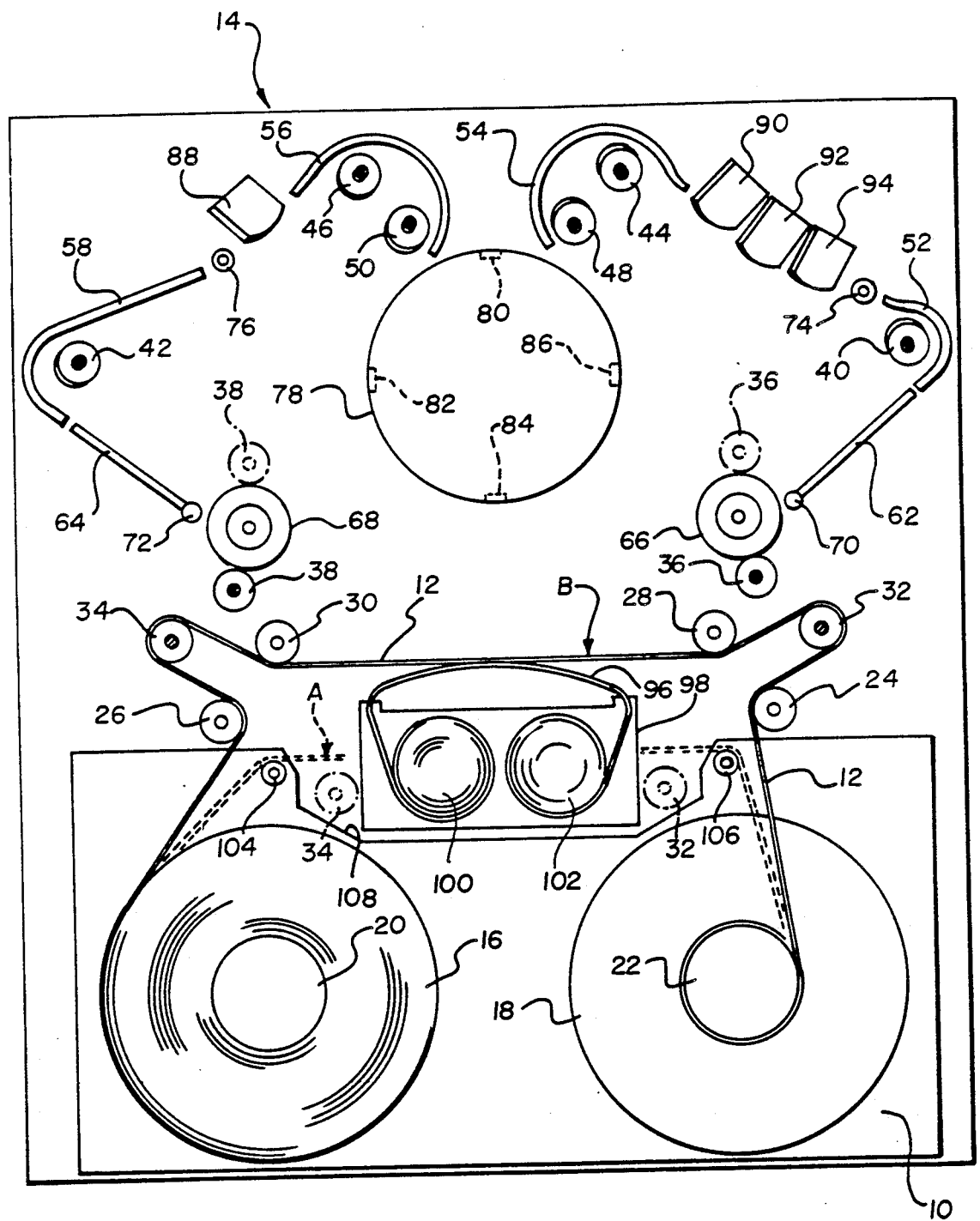
FIG. 1 is a diagrammatic plan view of the operative elements of a magnetic tape recorder incorporating an embodiment of the present invention.

Referring now to FIG. 1, there is shown an embodiment of the present invention as incorporated in the tape transport system of a helical scan magnetic tape recorder. As shown, a cassette 10 containing magnetic tape 12 is positioned relative to a tape transport system 14 of a helical scan magnetic tape recorder. Tape 12 is wound on and transported between supply reel 16 and take-up reel 18 which are respectively mounted for rotation on hubs 20 and 22.

The tape transport system 14 includes roller guides 24–50, fixed fence members 52, 54, 56 and 58, movable gate members 62 and 64, capstans 66 and 68, fixed guide posts 70, 72, 74 and 76. The transport elements of system 14 establish a tape transport path past rotary head scanner 78. Scanner 78 includes rotating heads 80, 82, 84 and 86. The tape path is also past fixed magnetic heads 88, 90, 92 and 94. Rotating heads 80, 82, 84 and 86 record on and reproduce from slant tracks on magnetic tape 12. Fixed magnetic heads 88, 90, 92 and 94 may serve several functions. Head 88 erases information from tape 12 before recording. Heads 90, 92 and 94 may record and reproduce data and control information from longitudinal tracks on tape 12 and monitor the signal recorded on tape 12 by rotating heads 88–94.

According to the present invention, magnetic tape contained in cassette 12 is automatically threaded about the transport path past scanner 78 by means of a flexible threading band 96 contained in a threading band cassette 98. Band 96 may, for example, comprise a strip of relatively stiff plastic material which is wound on reels 100 and 102.

When cassette 10 is loaded into the magnetic tape recorder, tape 12 has a segment which spans guides 104 and 106 of cassette 10 (as shown at position A in dashed lines in FIG. 1). Roller guides 24, 26, 28 and 30 are in a fixed position. Roller guides 32 and 34 are initially located behind the span segment of tape 12 in cassette 10 and project upward through opening 108 in cassette 10. Guides 32 and 34 are then moved behind tape 12 from the position shown in dashed lines in FIG. 1 to the position shown in solid lines in FIG. 1. Tape 12 is wrapped around rollers 24–34 to take position B shown in solid lines in FIG. 1. Rollers 32 and 34 may function to maintain tension. In position B, rollers 36–50 and capstans 66 and 68 are positioned above or below the plane of the final tape path, so that tape 12 may be threaded around scanner 78 past these transport elements. The transport elements from roller 38 to roller 50 slope downwardly from roller 38 to roller 50, while the transport elements from roller 36 to roller 48 slope upwardly, to wrap magnetic tape 12 around scanner 78 at the desired helix angle.

At this stage, threading band cassette 98 is moved into position behind the loop of tape 12 which has been extracted from cassette 10. Cassette 98 may be either raised or lowered into this position.

Figure 2:
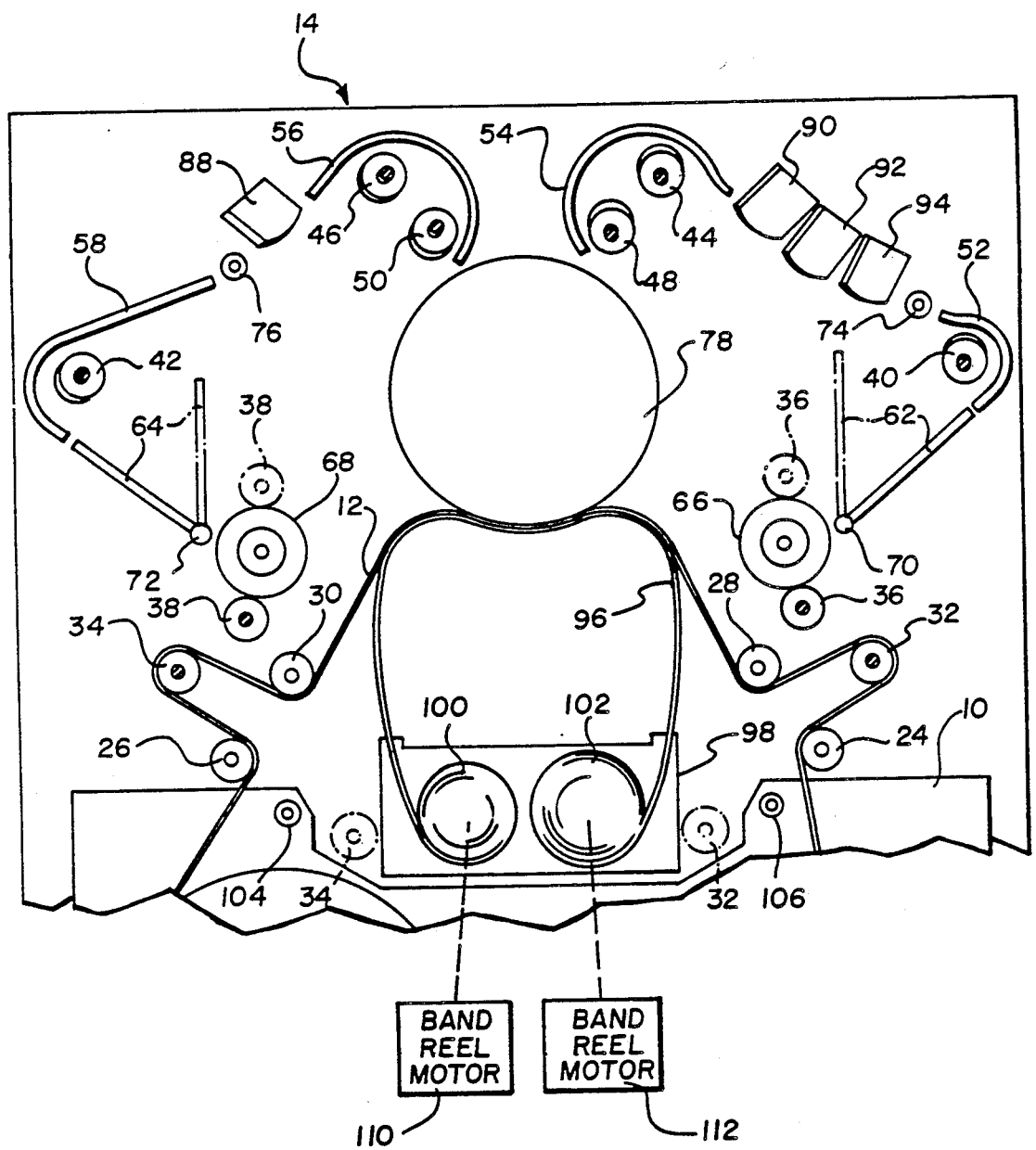
FIGS. 2–5 are top plan diagrammatic views illustrating the operation of the apparatus of FIG. 1.

As shown in FIG. 2, band 96 has been partially emitted from cassette 98 by rotation of reels 100 and 102 by means of band reel motors 110 and 112. Motors 110 and 112 are synchronously operated so that the two sides of band 96 will be unwound from reels 102 and 104 in equal lengths. Thus, band 96 and the loop of magnetic tape 12 engaged by band 96, will unroll onto scanner 78 without sliding on it. This eliminates potential damage to tape 12 and to the magnetic heads of scanner 78. At this time, gates 62 and 64 are swung into the positions shown in dashed lines in FIG. 2.

Figure 3:
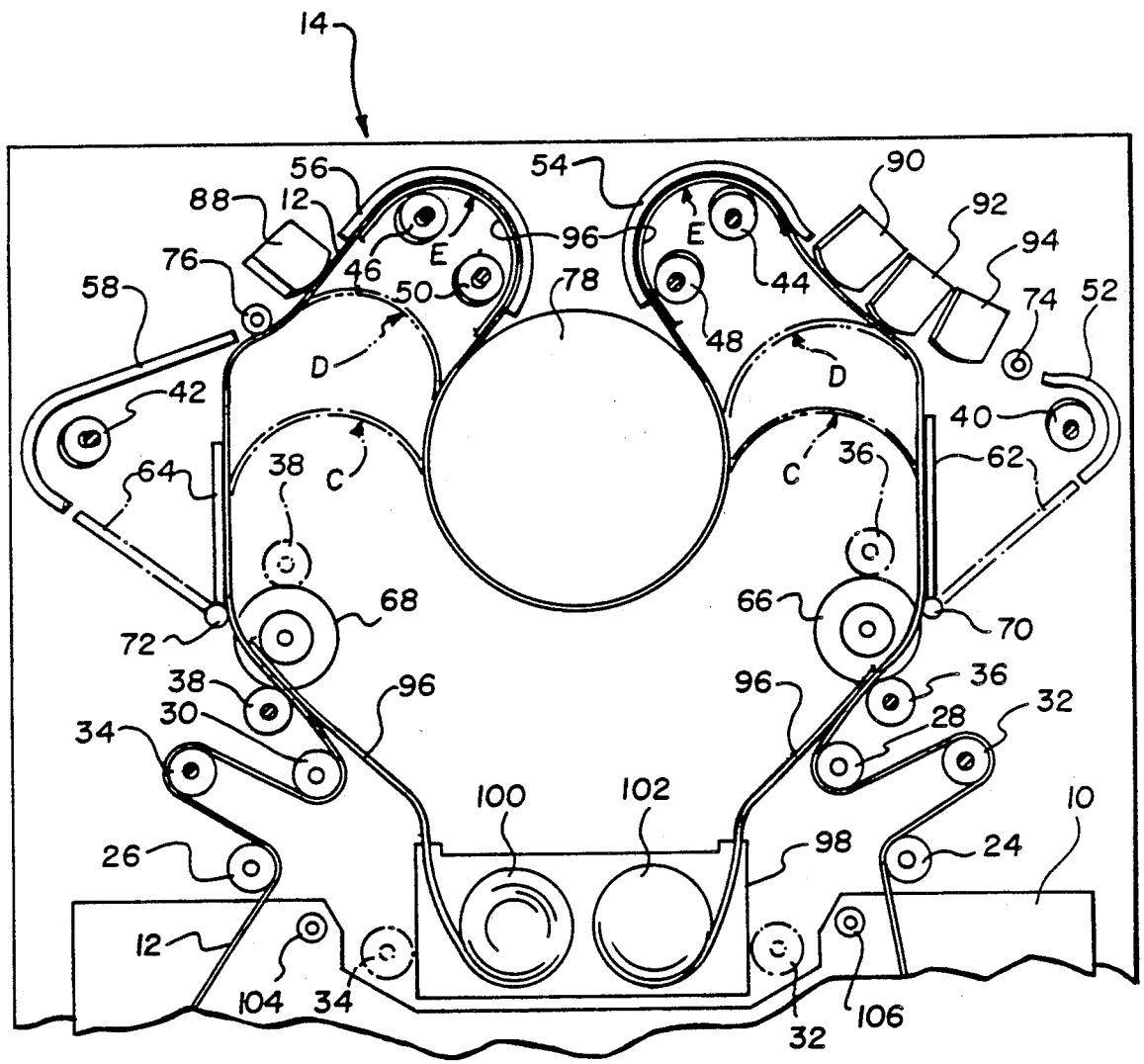

As shown in FIG. 3, as band 96 continues to be unwound from reels 100 and 102, band 96 and tape 12 continue to be wrapped around scanner 78 to take the configuration shown at positions C and D. Gate members 64 and 66 confine band 96 and tape 12, as they are expanded, to pass over rollers 44, 46, 48 and 50 and to settle against fence members 54 and 56 (positions E in FIG. 3).

Figure 4:
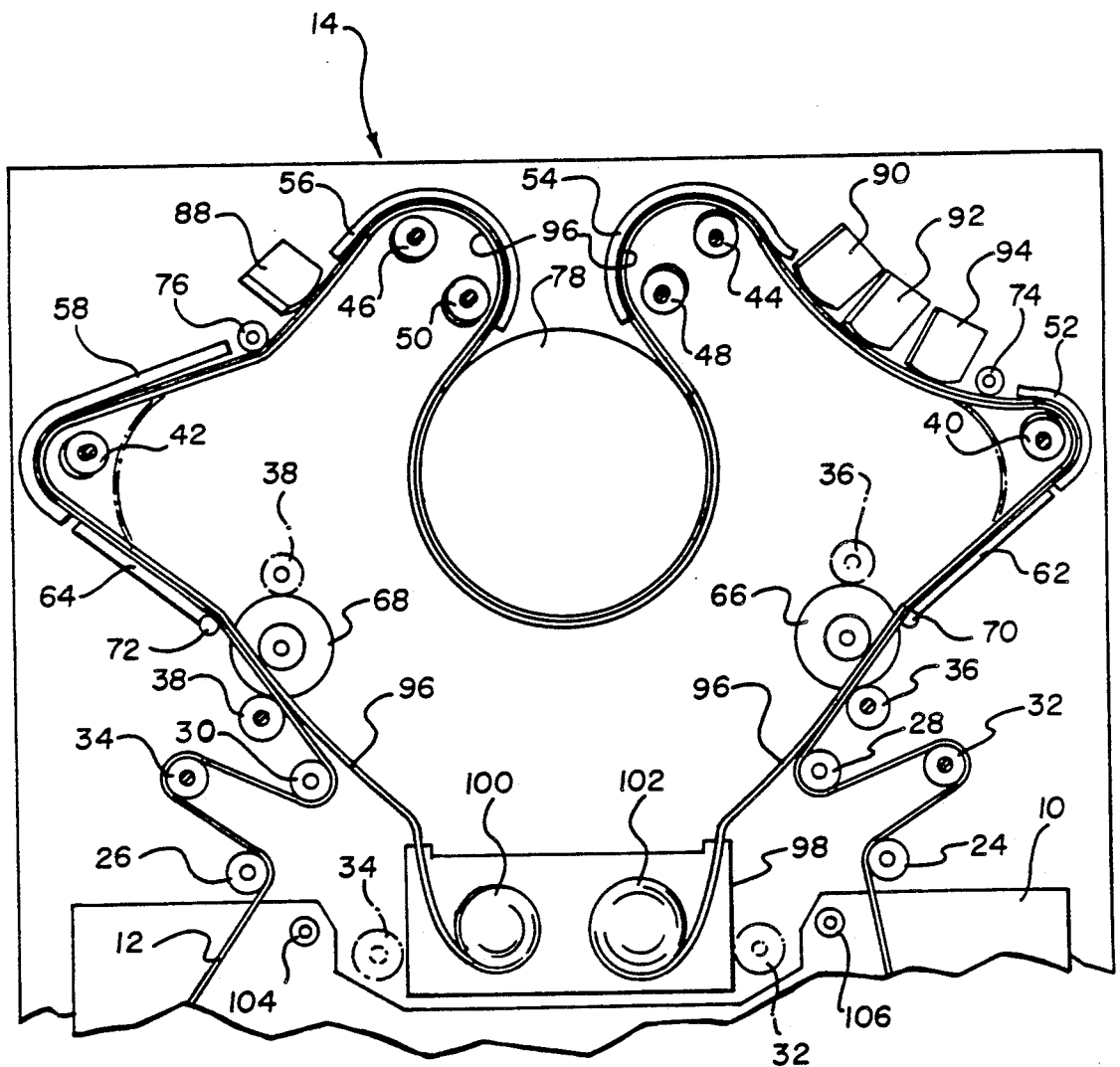
Figure 5:
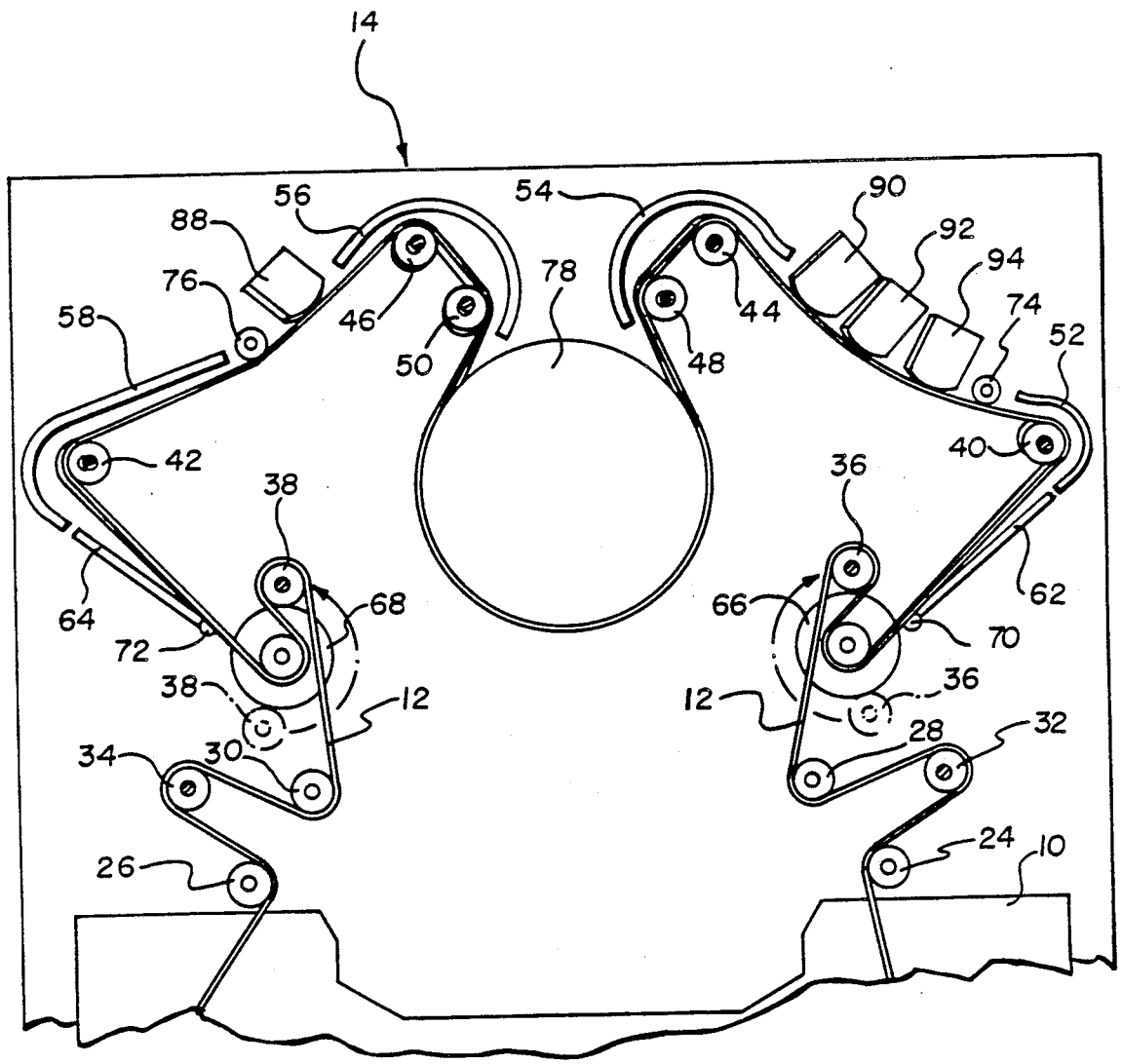

Thereafter, as shown in FIG. 4, gate members 62 and 64 are swung back to their original positions and band 96 is unwound further to push magnetic tape 12 past rollers 40 and 42 to be confined by gate members 62 and 64 and fence members 52 and 58. At this stage, capstans 66 and 68 and rollers 40 and 42 and rollers 44, 46, 48 and 50 are lowered into their respective planes of the tape path. Then the band 96 is rewound into its cassette 98 by spooling all onto one spool, for example, spool 100. The cassette is then raised or lowered to its store position where there is a guide chute so that the band can be pushed through the chute by spool 100 until half of the band is on spool 102. Meanwhile, the tape slack is taken up gently (less than running tension), and then rollers 36 and 38 are moved to wrap the tape on capstans 66 and 68. The unit is now ready to record or reproduce.

To withdraw the tape the reels 16 and 18 are held still and rollers 36 and 38 are moved to the positions shown in FIG. 1 to slack on the tape. Then the systems 66 and 68 and rollers 40, 42, 44, 46, 48 and 50 are moved out of the tape path planes and the tape slowly draws into the cassette by spooling onto both reels.

Figure 6:
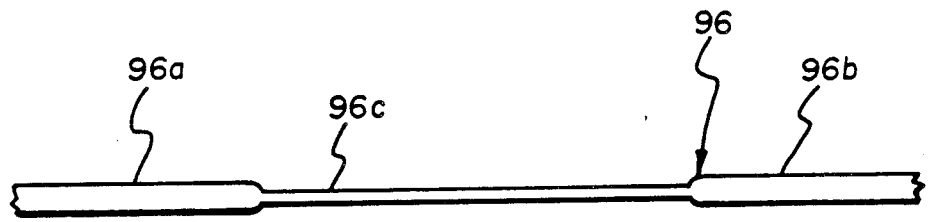
FIG. 6 is a diagrammatic view of another embodiment of the present invention.

As an alternative to movable gates 62 and 64, band 96 may be reduced in thickness to reduce its stiffness in selected places along its length. Thus, the more flexible segments of band 96 can be made to cause it to thread past rollers 44–50 around scanner 78 before it threads past rollers 42 and 40. This is shown in exaggerated form in FIG. 6 where band 96 is shown as having thick segments 96a and 96b and a thinner segment 96c which is more flexible than the thicker segments. Segment 96c may be used to wrap tape 12 around scanner 78.

Figure 7:
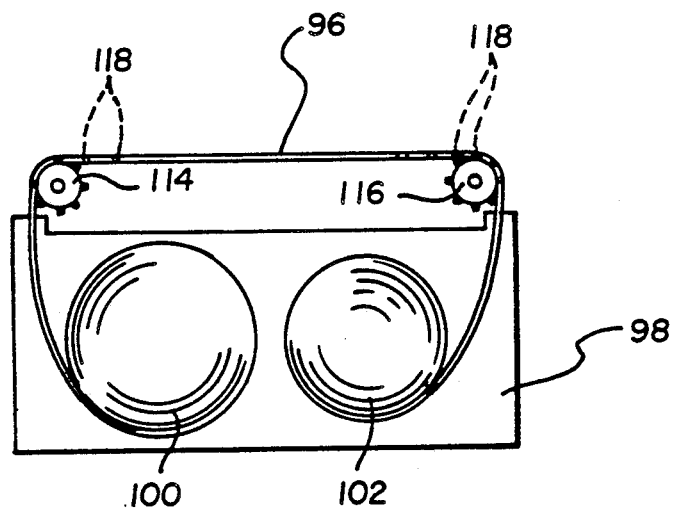
FIG. 7 is a diagrammatic view showing another embodiment of the present invention.

As an alternative to unwinding reels 100 and 102 to eject band 96 from cassette 98, band 96 may be formed with sprocket holes and be positively driven by means of sprocket drives. This is shown more clearly in FIG. 7, in which sprocket drives 114 and 116 engage sprocket holes 118 in band 96 to unwind band 96 from reels 100 and 102.

The invention has been described in detail with reference to the drawings, however, it will be appreciated that variations and modifications are possible within the scope and spirit of the invention.

What is claimed is:

1. In apparatus having a web-utilization station and means for receiving a supply of a web which may be transported past said web-utilization station, the invention comprising:
    a plurality of web transport elements arranged together with said web-utilization station, external to said web-receiving means, to transport the web from the web-receiving means along a predetermined transport path past said web-utilization station;
    a source of a flexible threading band which is movable into engagement with said web; and
    drive means for causing said threading band to be emitted from of said band source to engage said web to expand said band in the form of a loop toward said transport elements, such that the loop conforms to the shape of the predetermined transport path when said band expands to bring the web into operative contact with said web-utilization station and said transport elements.

2. The invention of claim 1 wherein said band source includes a container having at least one reel upon which said band is wound.

3. The invention of claim 2 wherein said container is movable between operative and nonoperative positions relative to said web.

4. Magnetic tape record/reproduce apparatus comprising:
    a magnetic head assembly;
    means for receiving a tape container having a long strip of magnetic tape which is wound on supply and takeup reels and which has a tape segment spanning said reels;
    a plurality of tape transport elements arranged together with said magnetic head assembly, external to a received tape container, to transport tape from the tape container along a transport path past said magnetic head assembly and back to said container;
    band means for supplying a flexible threading band which is movable into engagement with said magnetic tape; and
    drive means for causing said threading band to be emitted from said band means to engage said tape segment spanning said reels of said tape container, to expand said band in the form of a loop toward said transport elements, such that the band loop conforms to the shape of the predetermined transport path when said band expands to bring the magnetic tape into operative contact with said magnetic head assembly and said transport elements.

5. The apparatus of claim 4 wherein said magnetic head assembly includes a rotary head scanner having a rotating magnetic head.

6. The apparatus of claim 4 wherein said threading band has sprocket holes and including sprocket drive means for engaging said sprocket holes of said band to drive said band as it threads magnetic tape along said tape transport path.

7. The apparatus of claim 4 wherein said threading band has segments along the length thereof which are more flexible than other band segments in order to facilitate expansion of said band about said magnetic head assembly.

8. The apparatus of claim 4 wherein said receiving means receives a magnetic tape cassette containing magnetic tape which is wound on coplanar supply and takeup reels and which has a tape segment spanning said reels.

9. The apparatus of claim 8 wherein said band means includes a container for said flexible threading band which is located, relative to said tape spanning said supply and takeup reels of a received tape cassette, that, when said band is emitted from said container, it engages said tape.

* * * * *